UNITED STATES PATENT OFFICE.

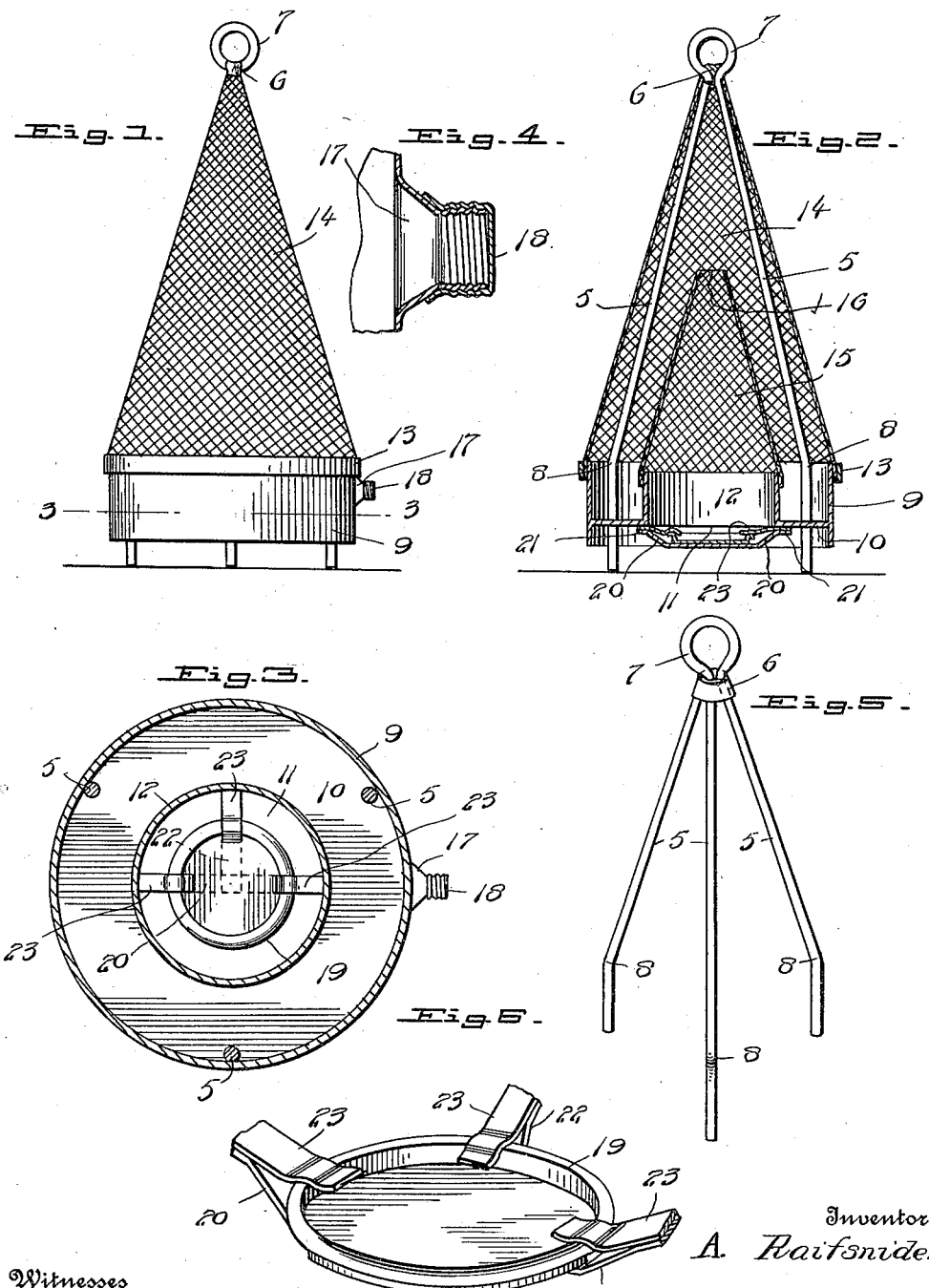

ALFRED RAIFSNIDER, OF GRANBURY, TEXAS.

FLY-TRAP.

1,092,537.  Specification of Letters Patent.  Patented Apr. 7, 1914.

Application filed July 17, 1913. Serial No. 779,620.

*To all whom it may concern:*

Be it known that I, ALFRED RAIFSNIDER, a citizen of the United States, residing at Granbury, in the county of Hood, State of Texas, have invented certain new and useful Improvements in Fly-Traps; and I do hereby declare the following to be a full, clear, and exact description of the invention, such as will enable others skilled in the art to which it appertains to make and use the same.

This invention relates to new and useful improvements in traps and particularly to traps for catching such insects as flies.

The object of the invention resides in the provision of a trap of the class described which is provided with means for drowning the insects caught therein, but which may also be used without exercising the drowning means.

A further object is to improve the efficiency and to simplify the general structure of devices of this character, and contemplates the provision of means for resiliently holding the bait pan.

With these and other objects in view, the invention resides in the novel combination, formation and arrangement of parts to be more fully hereinafter described and illustrated in the accompanying drawings hereto appended.

Reference is had to the accompanying drawings wherein similar characters of reference designate corresponding parts throughout the several views, and in which:

Figure 1 is a side elevational view of the trap, Fig. 2 is a vertical longitudinal sectional view thereof, Fig. 3 is a transverse sectional view on the line 3—3 of Fig. 1, Fig. 4 is a detail sectional view of the outlet, Fig. 5 is a perspective view of the main frame and Fig. 6 is a perspective view of the bait pan holding member.

Referring now more particularly to the drawings wherein is shown the preferred form of the invention, the numeral 5 designates the stiff wires which form the framework of the present invention. These wires are secured together at their upper end as at 6, one of them being extended and curved back to the securing point to form an eye 7 for carrying or hanging up the trap. The wires 5 diverge outwardly from the point 6 and have their lower end portions disposed as at 8 in a vertical plane and forming the legs of the trap. Disposed about the vertical portions of the wires and spaced from the free ends thereof is an annular wall 9 extending in a vertical plane. Extending inwardly from the wall 9 is a plate 10 provided with a central circular opening 11 from the edge of which extends upwardly a second annular wall 12.

From the foregoing it is observed that a very rigid structure has been provided, which possesses the utmost simplicity, the various parts of the structure being preferably soldered together.

Secured to the upper edge of the wall 9 and held by a band 13 is a conical foraminous member 14 having its apex at the securing point 6 of the wires 7. Secured to the upper edge of the wall 12 is a second conical foraminous member 15 having the fly inlet opening 16 and its apex.

The insect enters through the opening 11 and passes through the inlet 16 into the space between the two foraminous members, which form the trap chamber. It is observed that the walls 9 and 12 and plate 10 form an annular liquid-tight chamber in which is adapted to be placed water or oil so that the imprisoned fly will fall therein and drown, it being understood that the trap may be used also without the water or oil. The outlet for the strap comprises a cylindrical extension 17 extending outwardly from the plate 9 and provided with a screwed cap 18.

For holding the bait pan 19 adjacent the opening 11, a strip 20 has its end portion upwardly offset and secured at 21 to the plate 10. A second strip 22 is secured to the strip 20 and the plate 9 and the pan is resiliently held on said strips by spring arms 23 disposed over the strips 20 and 22 secured to the plate 9.

What is claimed is:

1. A fly trap comprising a plurality of rods connected together at their upper ends, diverging downwardly and terminating in vertical portions, an annular receptacle secured to the vertical portions and adapted to form a liquid receiving well, and comprising inner and outer walls and a bottom, a foraminous cone-shaped section secured to the outer wall of the receptacle and terminating adjacent the connecting point of the rods and a second conical foraminous section secured to the inner wall of the receptacle and extending in spaced parallel relation to the first section, and said section being provided with an inlet opening.

2. A fly trap comprising a plurality of rods connected together at their upper ends, diverging downwardly and terminating in vertical portions, an annular wall portion secured to the vertical portions of the rods, a plate extending inwardly from the said wall and provided with a central opening, a second annular wall extending upwardly from the plate adjacent the opening, a conical foraminous member secured to the first wall and terminating at the connection of the rods, a second conical foraminous member secured to the second wall and in parallel relation to the first conical member and provided with an inlet opening and means depending from the said plate for carrying a bait pan.

3. In a fly trap, the combination with a receptacle having a central opening, of a strip disposed across the opening and having its intermediate portions downwardly offset, a second strip secured to the central portion of the first and having one end upwardly offset, the upper portions of said strips being secured to the receptacle, spring arms disposed over the strips and a bait pan held on the strips by the said spring arms.

In testimony whereof, I affix my signature, in the presence of two witnesses.

FRED RAIFSNIDER.

Witnesses:
BEN ESTES,
CLYDE RAFFINS.

Copies of this patent may be obtained for five cents each, by addressing the "Commissioner of Patents, Washington, D. C."